United States Patent
Cheung et al.

(10) Patent No.: US 8,270,845 B2
(45) Date of Patent: Sep. 18, 2012

(54) MULTIMODE FIBER TAP FOR A LRM CONNECTION

(75) Inventors: Thomas K. Cheung, Fremont, CA (US); King L. Won, San Jose, CA (US); Patrick P. Leong, Palo Alto, CA (US)

(73) Assignee: Gigamon LLC, Milpitas, CA (US)

( * ) Notice: Subject to any disclaimer, the term of this patent is extended or adjusted under 35 U.S.C. 154(b) by 655 days.

(21) Appl. No.: 12/372,509

(22) Filed: Feb. 17, 2009

(65) Prior Publication Data

US 2010/0209047 A1    Aug. 19, 2010

(51) Int. Cl.
*H04B 10/00* (2006.01)
*G02B 27/10* (2006.01)
(52) U.S. Cl. ......... 398/180; 398/212; 398/214; 359/618
(58) Field of Classification Search .................. 398/212, 398/214, 180; 359/618
See application file for complete search history.

(56) References Cited

U.S. PATENT DOCUMENTS

| | | | | |
|---|---|---|---|---|
| 5,818,617 | A * | 10/1998 | Shipley ........................... | 398/54 |
| 5,872,646 | A * | 2/1999 | Alderman et al. ............ | 398/151 |
| 7,809,235 | B2 * | 10/2010 | Reagan et al. ................. | 385/135 |
| 2007/0154212 | A1 * | 7/2007 | Ruchet et al. .................... | 398/9 |
| 2007/0297733 | A1 * | 12/2007 | Mader et al. .................. | 385/123 |

* cited by examiner

*Primary Examiner* — Nathan Curs
(74) *Attorney, Agent, or Firm* — Vista IP Law Group, LLP

(57) ABSTRACT

A device for processing data being optically transmitted via a LRM connection includes an optical splitter for splitting an input signal into a first output signal and a second output signal, the optical splitter having an operating wavelength with a value that is between 1260 nm and 1355 nm, wherein the optical splitter has an input end for receiving the input signal, a first output end for outputting the first output signal, and a second output end for outputting the second output signal.

22 Claims, 5 Drawing Sheets

MULTIMODE FIBER TAP FOR A LRM CONNECTION

FIELD

This application relates generally to network monitoring devices, and more specifically, to multimode test access point (TAP) for a Long Reach Multimode (LRM) connection.

BACKGROUND

Multimode optical fiber has been used for optically transmitting data. Multimode fibers installed in the early 1990s exhibit large amounts of modal dispersion, making it challenging to provide a desirable transmission channel (particularly at 10 Gbit/s data rate), and limiting the transmission distance significantly. For example, 10 Gigabit Ethernet 850-nm devices for multimode fiber (10GBASE-SR) can operate up to only 26 m on a 62.5-μm multimode fiber. This is because with multimode fiber, light can have more paths to travel inside the fiber, and hence, there is more dispersion. This is undesirable for communications because each light pulse representing a "0" or "1" can get distorted by the time it is being received at the other end.

10GBASE-LRM has been used for extended reach on multimode fiber. For example, LRM can enable the upgrade of existing optical links between data center switches and workgroup switches to 10 Gigabit Ethernet. 10GBASE-LRM uses long wavelength optics and a receiver with an adaptive electronic equalizer integrated circuit in the receive chain in order to enable long distance (e.g., up to 220 m) transmission on multimode fiber. The adaptive equalization, known as EDC, is used to compensate for the differential modal dispersion (DMD) present in fiber channels. In some applications, LRM has been designed for vertical riser applications in building backbones, which require longer transmission distances. LRM is standardized in the IEEE Std. 802.3aq-2006.

A TAP is a mechanism for capturing data stream from a network link, such as a high-speed network link. An optical TAP is configured to split an optical signal into two (or more) optical streams according to a pre-determined power ratio. One signal is passed through to the network while the other signal is transmitted into an analyzer, such as a network monitoring tool.

It is very common to find 850 nm optical signals running on a multimode fiber taps. This is because both the transmission source (laser diode or led) and the multimode fiber taps for the 850 nm wavelength are relatively inexpensive. Existing multi-mode fiber taps work in the 850 nm range, and they are mainly used for short distance communications. However, Applicant discovers that when 10GBASE-LRM runs a laser light, such as light signals at the 1310 nm wavelength, through these multi-mode fibers, these multimode fiber taps may not work. In particular, Applicant has discovered that the materials (which are not designed to split at the laser wavelength range) in these multimode fiber taps may have high absorption at the laser wavelength range, leading to very weak signals for the tap's outputs. In some cases, if such weak signals are used by network devices, they may lead to processing error.

SUMMARY

In accordance with some embodiments, a device for processing data being optically transmitted via a LRM connection includes an optical splitter for splitting an input signal into a first output signal and a second output signal, the optical splitter having an operating wavelength with a value that is between 1260 nm and 1355 nm, wherein the optical splitter has an input end for receiving the input signal, a first output end for outputting the first output signal, and a second output end for outputting the second output signal.

In accordance with other embodiments, a method for processing data being optically transmitted includes optically receiving an input signal that is being transmitted via a LRM connection, splitting the input signal into a first output signal and a second output signal using an optical splitter, the optical splitter having an operating wavelength with a value that is between 1260 nm and 1355 nm, outputting the first output signal, and outputting the second output signal.

Other and further aspects and features will be evident from reading the following detailed description of the embodiments, which are intended to illustrate, not limit, the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
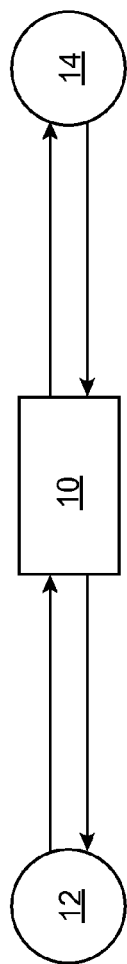
FIG. 1 illustrates a device for processing data being optically transmitted in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a device 10 for processing data that are being transmitted optically in accordance with some embodiments. The device 10 is optically coupled between a first node 12 and a second node 14 in a 10GBASE-LRM network. In the illustrated embodiments, the first node 12 is optically coupled to the device 10 via a multimode fiber that transmits 10GBASE-LRM traffic, and the second node 14 is optically coupled to the device 10 via another 10GBASE-LRM multimode optical fiber. In multimode optical fiber, light signal follows multiple paths, thereby resulting in differential mode delay.

In the illustrated embodiments, the device 10 is configured to receive network traffic (input signal) that is being transmitted from node 12 towards node 14, and convert the input signal into two output signals. The device 10 then passes one of the two output signals to the node 14, and transmits the other one of the two output signals to a processor for analyzing the signal, such as for network monitoring. Similarly, when the second node 14 transmits a signal towards the first node 12, the device 10 is configured to receive the input signal from the second node 14, and convert the input signal into two output signals. The device 10 then passes one of the two output signals to the first node 12, and transmits the other one of the two output signals to the processor for analyzing the signal. Thus, in the illustrated embodiments, the device 10 is configured to support full duplex communications.

Figure 2:
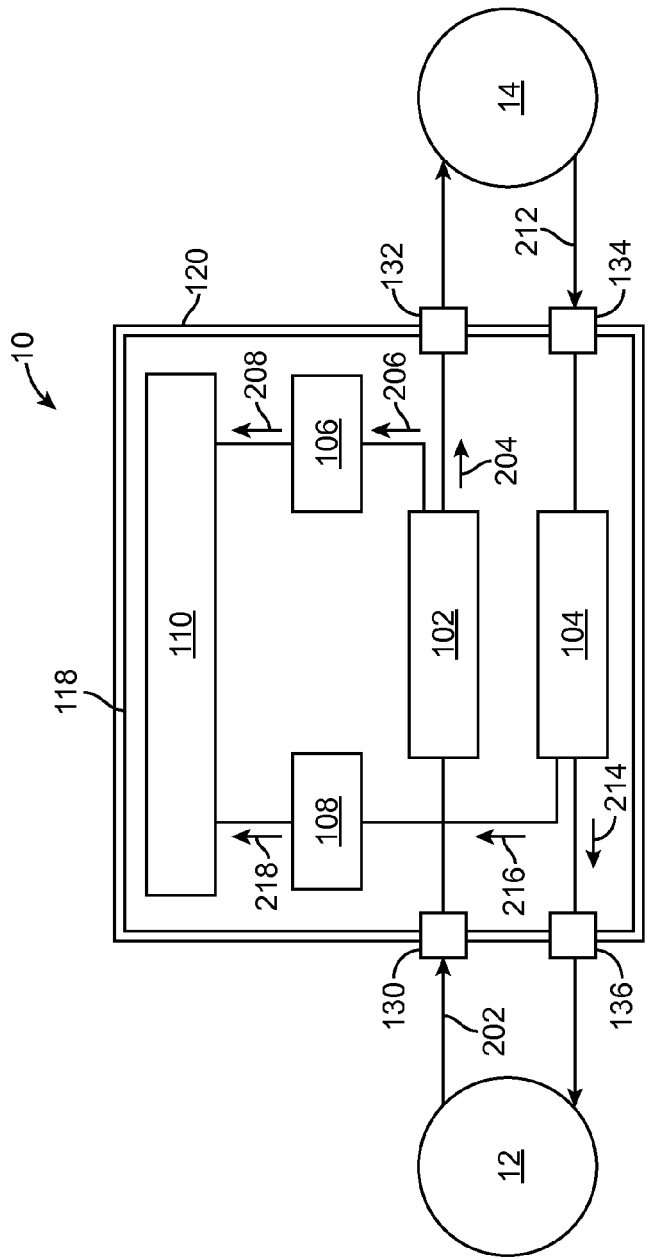
FIG. 2 illustrates the device of FIG. 1 in accordance with some embodiments, showing the device duplex.
Figure 3:
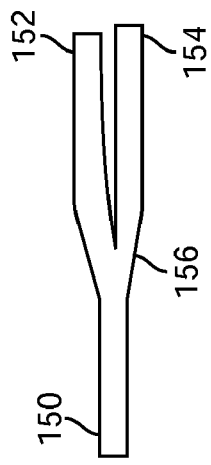
FIG. 3 illustrates an optical splitter in accordance with some embodiments.

FIG. 2 illustrates the device 10 in accordance with some embodiments. The device 10 includes a first optical splitter 102, a second optical splitter 104, a first optical receiver 106 coupled to the first optical splitter 102, a second optical receiver 108 coupled to the second optical splitter 104, and a processor 110 coupled to the optical receivers 106, 108. In some embodiments, each of the optical receivers 106, 108 may be a stand-alone device. In other embodiments, each of the optical receivers 106, 108 may be a part of a device, such as a transceiver that includes a transmitter and a receiver. In the illustrated embodiments, each of the optical receivers 106, 108 has an operating wavelength (e.g., a wavelength to which the optical receiver is relatively more sensitive) with a value that is between 1260 nm and 1355 nm (e.g., 1310 nm). In some embodiments, each optical receiver may include a photodetector that is doped in a certain way so that the optical receiver is more sensitive at the prescribed operating wavelength. The components 102, 104, 106, 108, 110 may be mounted to a board 118, e.g., a circuit board. The device 10 also includes a housing 120 for housing components 102, 104, 106, 108, 110, and a plurality of optical ports 130, 132, 134, 136. In the illustrated embodiments, the ports 130, 132 are on a different side from that associated with ports 134, 136. In other embodiments, all of the ports may be located on a same side of the housing 120. The optical port 130 is optically coupled to the input end 150 of the first optical splitter 102 (e.g., via a fiber optic) and is for receiving input optical signal (FIG. 3). The optical port 132 is optically coupled to one of the two output ends 152, 154 of the first optical splitter 102 (e.g., via a fiber optic) and is for outputting optical signal. The optical port 134 is optically coupled to the input end of the second optical splitter 104 (e.g., via a fiber optic) and is for receiving input optical signal. The optical port 136 is optically coupled to one of the two output ends of the second optical splitter 104 (e.g., via a fiber optic) and is for outputting optical signal. In some embodiments, any of the ports 130, 132, 134, 136 may be a mechanical connector that is configured to detachably couple to an end of an optical fiber cable.

The first optical splitter 102 is configured to receive an input signal 202 from the first node 12, and split the input signal 202 into a first output signal 204 and a second output signal 206. The output signals 204, 206 are the same for practical purposes, but the power levels of the respective signals 204, 206 may or may not be the same, depending on the signal strength split ratio that is associated with the first optical splitter 102. The first output signal 204 is passed downstream towards the second node 14, the intended recipient, and the second output signal 206 is analyzed by the device 10, such as to perform various network monitoring functions. Similarly, when dealing with transmission from the second node 14, the second optical splitter 104 is configured to receive an input signal 212 from the second node 14, and split the input signal 212 into a first output signal 214 and a second output signal 216. The output signals 214, 216 are the same for practical purposes, but the power levels of the respective signals 214, 216 may or may not be the same, depending on the signal strength split ratio that is associated with the first optical splitter 104. The first output signal 214 is passed downstream towards the first node 12, the intended recipient, and the second output signal 216 is analyzed by the device 10, such as to perform various network monitoring functions.

In the illustrated embodiments, each of the optical splitters 102, 104 has an operating wavelength with a value that is between 1260 nm and 1355. For example, in some embodiments, the operating wavelength may have a value that is centered between 1260 nm and 1355 nm. In another example, the operating wavelength may be 1310 nm. In some cases, each of the optical splitters 102, 104 is configured to provide a split ratio of 50/50, in which case, the power (signal strength) of each of the two output light signals will be close to 50% (e.g., 50%±10%) of the input signal. In other cases, each of the optical splitters 102, 104 is configured to provide a split ratio of 30/70, in which case, the power of one output signal will be close to 30% (e.g., 30%±10%) of the input signal, and the power of the other output signal will be close to 70% (e.g., 70%±10%) of the input signal. In some embodiments, the split ratio can be any split ratio as long as the signal strength at any of the output ends of the optical splitter is adequate for the intended function of the receiving device that receives the output signal. The optical splitters 102, 104 may have other prescribed split ratios in other embodiments. Although the optical splitters 102, 104 have been described as splitting light signal into two parts, in other embodiments, each of the optical splitters 102, 104 may be configured to split signal into more than two parts. Thus, as used in this specification, the term "optical splitter" refers to any optical device that is capable of splitting light signal into two or more parts (e.g., 16), which may or may not be equal parts.

Various techniques may be employed to construct the optical splitters 102, 104. For example, in some embodiments, the optical splitter may be constructed by fusing two optical fibers together. For example, the optical splitter 102/104 may be constructed by stripping a first fiber optic cable to expose the glass component of the first fiber optic cable, stripping a second fiber optic cable to expose the glass component of the second fiber optic cable, and fusing together the glass components of the respective first and second fiber optic cables. Other techniques that are known in the art of optical devices may also be used to make the optical splitter. Techniques for making optical splitters that operate at certain prescribed wavelength are well known in the art, and therefore, will not be described in further details.

The first optical receiver 106 is configured to receive the output optical signal 206 from the first optical splitter 102, and convert the optical signal 206 into electrical signal 208. Similarly, the second optical receiver 108 is configured to receive an optical signal 216 from the second optical splitter 104, and convert the optical signal 216 into electrical signal 218. Optical receivers that can be used with the device 10 are commercially available, such as from Sumitomo Electric Industries, Ltd., and will not be described in further detail.

The processor 110 is configured to receive electrical signals from the receivers 106, 108, and analyze the signals. In some embodiments, the processor 110 is configured to process the signals to perform various network functions, such as signal duplication, intrusion detection, network analysis, network monitoring, or combination thereof. For examples, in some applications, the processor 110 may be configured for 10G network monitoring, isolating and capturing sessions across parallel links and switches, sharing scarce span ports between multiple tools, filtering and customizing data flow to each tool, dividing large loads across multiple tools, aggregating multiple links simultaneously to multiple tools, or combination thereof. It should be noted that the processor 110 does not need to perform the entire process to accomplish any of the foregoing functions, and that the processor 110 may be configured to perform a part of the process for any of the foregoing functions. The processor 110 may be implemented using hardware, software, or combination thereof. Also, the processor 110 may be implemented using one or more processing units, each of which may be considered a "processor" by itself. Thus, as used in this specification, the term "processor" is not limited to a single processing unit, and may refer to more than one processing units, such as more than one processors.

During use, the first node 12 transmits a signal downstream towards the second node 14. The signal is transmitted optically in the form of a light signal at or around 1310 nm using 10GBASE-LRM fiber. The optical signal is received by the first optical splitter 102 as the input signal 202, and the first optical splitter 102 splits the optical signal 202 into the two output signals 204, 206 in accordance with the prescribed split ratio that is associated with the optical splitter 102. The first output signal 204 is passed downstream so that it can be transmitted to the second node 14. The second output signal 206 is transmitted optically via a fiber optic to the optical receiver 106, which converts the optical output signal 206 to electrical signal(s) 208. The electrical signal(s) 208 is then transmitted to the processor 110, which processes the electrical signal(s) 208 to perform various functions described herein. Similar method applies for optical signal at or around 1310 nm wavelength being transmitted using 10GBASE-LRM fiber from the second node 14 to the first node 12.

Because the input light signal is at or around 1310 nm wavelength, and because the first optical splitter 102 is specifically configured to have an operating wavelength that is between 1260 nm and 1355 nm (e.g., such that the splitter 102 operates at or around the 1310 nm wavelength), the operation of the device 10 does not result in wavelength mismatch between optical splitter's wavelength and signal's wavelength, thereby preventing unexpected optical power loss from occurring at the optical output. In particular, because the operating wavelength of the optical splitter 102 matches that of light signal being transmitted by the 10GBASE-LRM fiber, the power of each of the output optical signals 204, 206 is equal or close to that from the prescribed split ratio. For example, if the prescribed split ratio for the optical splitter 102 is 50/50, due to the matching of the operating wavelength for the optical splitter 102 and the input light signal, the power of each of the output signals 204, 206 will be equal or close (e.g., with ±10%) to 50% of the input power. This is because the physics behind splitting an optical beam involves the interaction of electromagnetic waves (the optical beam itself) with materials, such as prisms, fibers, metal coating, etc., which is wavelength dependent. For example, some materials can be quite reflective for some wavelengths, but can be less reflective on other wavelengths.

Providing an optical splitter that is specifically configured to have an operating wavelength anywhere between 1260 nm and 1355 nm for receiving 1310 nm light signal is advantageous, because it allows signal(s) to be accurately and reliably transmitted from the optical splitter 102 for processing by the receiver 106, the processor 110, and/or another device. This is because if the optical splitter's operating wavelength does not match that of the light signal, the mismatch may cause unexpected power loss for the output signal. For example, if the prescribed split ratio for the optical splitter 102 is 50/50, the power of the output signal 206 may be 25% (instead of 50%) due to wavelength mismatch. The unexpected decrease of signal strength may prevent a receiving device at downstream, such as the processor 110, from decoding the optical signal accurately and reliably. For example, when decoding the optical signal to 0's and 1's, the receiving device may inaccurately determine that the signal is "0" (when it should have been "1") because the optical output signal's strength may not be high enough to meet the threshold level for conversion to the binary value "1." In some cases, if the signal transmitted to the processor 110 is inaccurate, and the processor 110 cannot use the signal to perform various functions described herein. By configuring the optical splitter 102 so that its operating wavelength matches that of the input optical signal, the power of the output signals 204, 206 will be close to that prescribed by the split ratio of the optical splitter 102. Also, using a multimode optical splitter with an operating wavelength anywhere between 1260 nm and 1355 nm to receive light signal at 1310 nm wavelength results in relatively less signal dispersion compared to optical splitters that operate at other ranges, such as an optical splitter that operates at 850 nm wavelength for receiving 1310 nm light signals.

Figure 4:
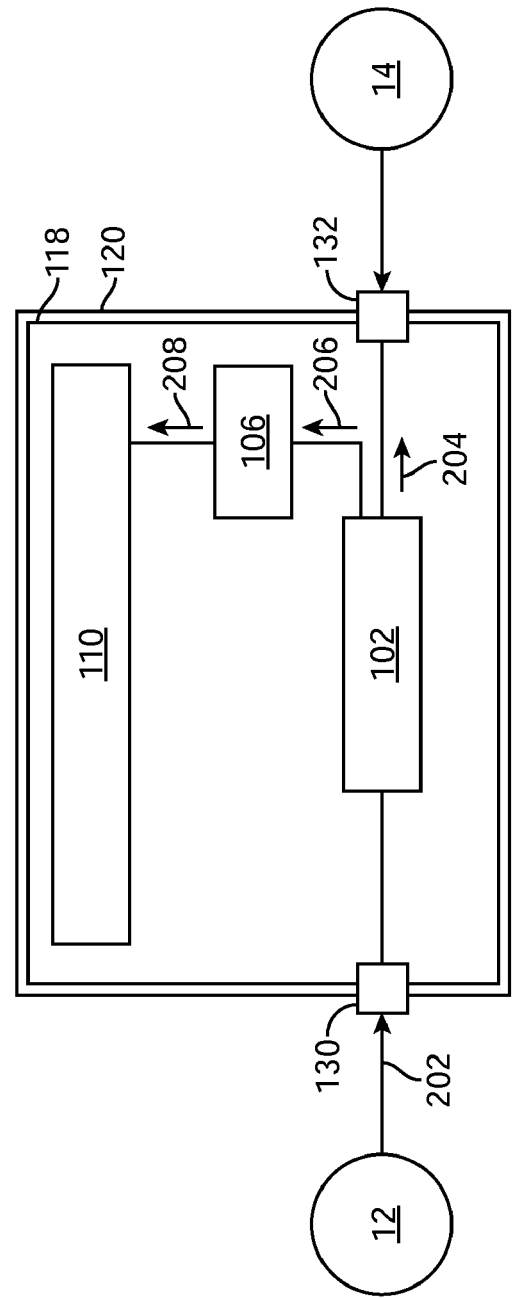
FIG. 4 illustrates the device of FIG. 1 in accordance with other embodiments.

It should be noted that the device 10 is not limited to duplex operation, and that any of the embodiments of the device 10 described herein may be configured for one way communication. FIG. 4 illustrates a variation of the device 10 which is configured for one way communication. As shown in the figure, the device 10 does not include the second optical splitter 104 and the second optical receiver 108.

Figure 5:
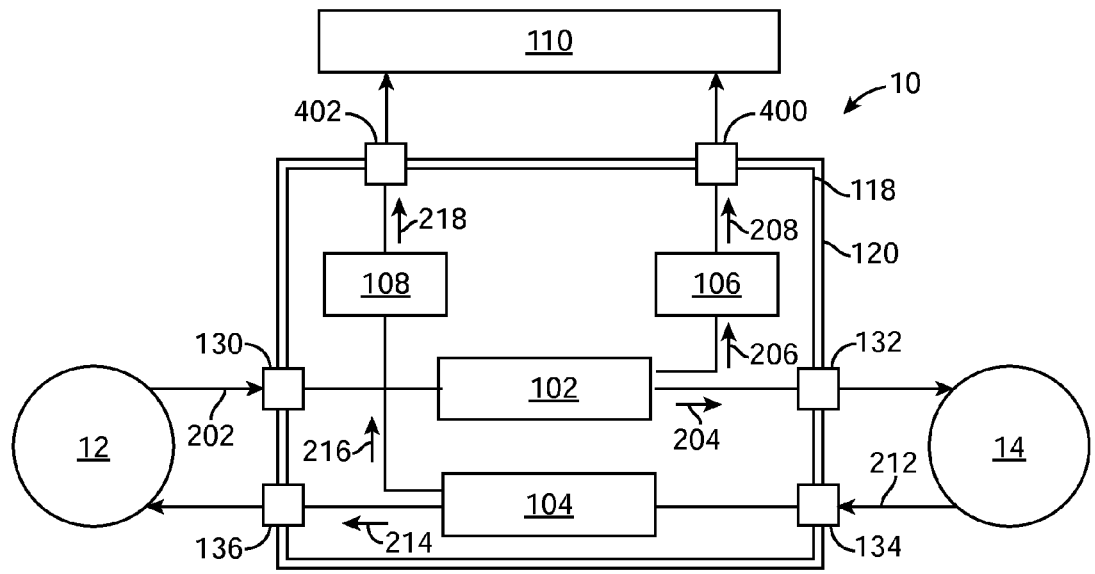
FIG. 5 illustrates the device of FIG. 1 in accordance with other embodiments.

In the above embodiments, the device 10 includes the processor 110. However, in other embodiments, the device 10 may not include the processor 110. For example, in other embodiments, the device 10 may be implemented as an external TAP. FIG. 5 illustrates a variation of the device 10 which does not include the processor 110. The device 10 is optically coupled between a first node 12 and a second node 14 in a 10GBASE-LRM network. In the illustrated embodiments, the device 10 includes a first optical splitter 102 having an input end coupled to an input port 130, a first output end coupled to an output port 132, and a second output end coupled to a first optical receiver 106. The device 10 also includes a second optical splitter 104 having an input end coupled to an input port 134, a first output end coupled to an output port 136, and a second output end coupled to a second optical receiver 108. In the illustrated embodiments, each of the optical splitters 102, 104 has an operating wavelength with a value that is between 1260 nm and 1355 nm. Also, each of the optical receivers 106, 108 has an operating wavelength with a value that is between 1260 nm and 1355 nm. The functions of these components are similar to those described with reference to the embodiments of FIG. 2. The device 10 also includes a first electrical output port 400 coupled to the first optical receiver 106, and a second electrical output port 402 coupled to the second optical receiver 108. In some embodiments, each of the output ports 400, 402 may be a mechanical connector that is configured to detachably couple to an end of a network cable. During use, the electrical output ports 400, 402 are used to couple the optical receivers 106, 108 to a processor 110, e.g., via network cables. The first optical receiver 106 is configured to convert optical signal from the optical splitter 102 to electrical signal(s), and transmit the electrical signal(s) to the processor 110 for processing. Similarly, the second optical receiver 108 is configured to convert optical signal from the optical splitter 104 to electrical signal(s), and transmit the electrical signal(s) to the processor 110 for processing. In other embodiments, instead of coupling to a same processor 110, the optical receivers 106, 108 may be coupled to respective processors via the ports 402, 400, respectively. In the illustrated embodiments, the ports 400, 402 are located on different sides of the housing 120 from that associated with the ports 130, 136, and ports 132, 134. In other embodiments, all of the ports may be located on a same side of the housing 120. Also, in other embodiments, instead of having two optical splitters for allowing duplex operation, the device 10 of FIG. 5 may include only one optical splitter (similar to that shown in FIG. 4) for one-way communication.

Figure 6:
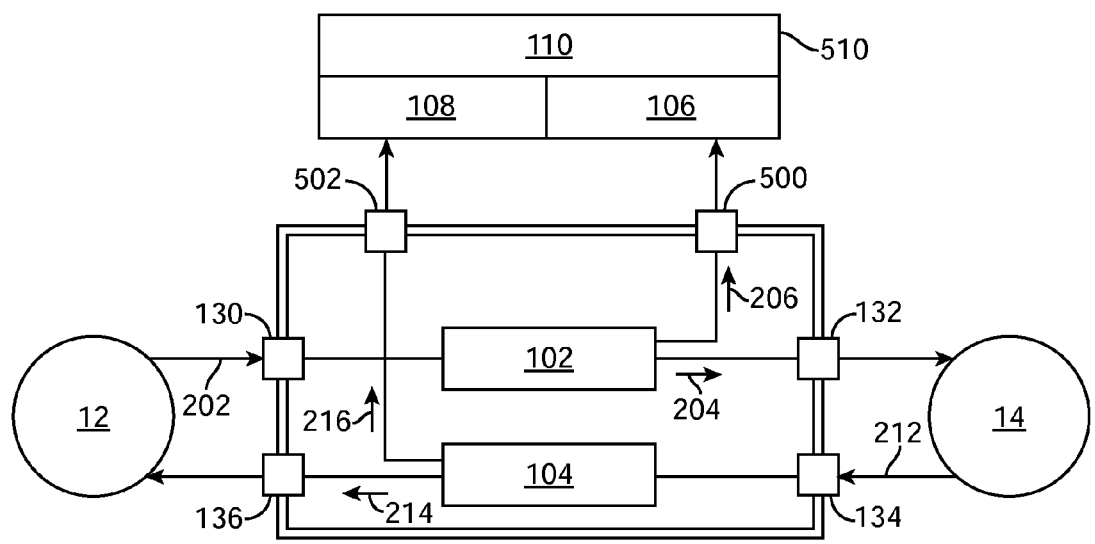
FIG. 6 illustrates the device of FIG. 1 in accordance with other embodiments.

In other embodiments, the device 10 may not include any optical receiver. FIG. 6 illustrates a variation of the device 10 that does not include any optical receiver. The device 10 is optically coupled between a first node 12 and a second node 14 in a 10GBASE-LRM network. In the illustrated embodiments, the device 10 includes a first optical splitter 102 with an input end coupled to an input port 130, a first output end coupled to output port 132, and a second output end coupled to output port 500. The output port 500 is an optical port for allowing the device 10 to optically coupled to another device 510. The device 10 also includes a second optical splitter 104 with an input end coupled to an input port 134, a first output end coupled to output port 136, and a second output end coupled to output port 502. The output port 502 is also an optical port for allowing the device 10 to optically coupled to the device 510. In some embodiments, each of the output ports 500, 502 may be a mechanical connector that is configured to detachably couple to an end of a fiber optic cable. In the illustrated embodiments, each of the optical splitters 102, 104 has an operating wavelength with a value that is between 1260 nm and 1355 nm. As shown in the figure, the device 510 includes a first optical receiver 106 for optically receiving light signal from the device 10 via port 500, a second optical receiver 108 for optically receiving light signal from the device via port 502, and processor 110 for processing electrical signals from the receivers 106, 108. In the illustrated embodiments, the ports 500, 502 are located on different sides of the housing 120 from that associated with the ports 130, 136, and ports 132, 134. In other embodiments, all of the ports may be located on a same side of the housing 120. Also, in other embodiments, instead of having two optical splitters for allowing duplex operation, the device 10 of FIG. 6 may include only one optical splitter (similar to that shown in FIG. 4) for one-way communication.

It should be noted that the device 10 is not limited to the embodiments described previously, and that the device 10 may have other configurations in other embodiments. For example, in any of the embodiments described herein, the output port 132 may not be an optical port. Instead, the port 132 may be a electrical output port. In such cases, the device 10 may further include another optical receiver coupled between the first optical splitter 102 and the output port 132 for converting optical signal from the optical splitter 102 to electrical signal(s). Similarly, in any of the embodiments described herein, the output port 136 may not be an optical port. Instead, the port 136 may be an electrical output port. In such cases, the device 10 may further include another optical receiver coupled between the second optical splitter 104 and the output port 136 for converting optical signal from the optical splitter 104 to electrical signal(s). Also, in further embodiments, the device 10 may include more than two optical splitters for coupling to more than one node 12 and/or more than one node 14.

Figure 7:
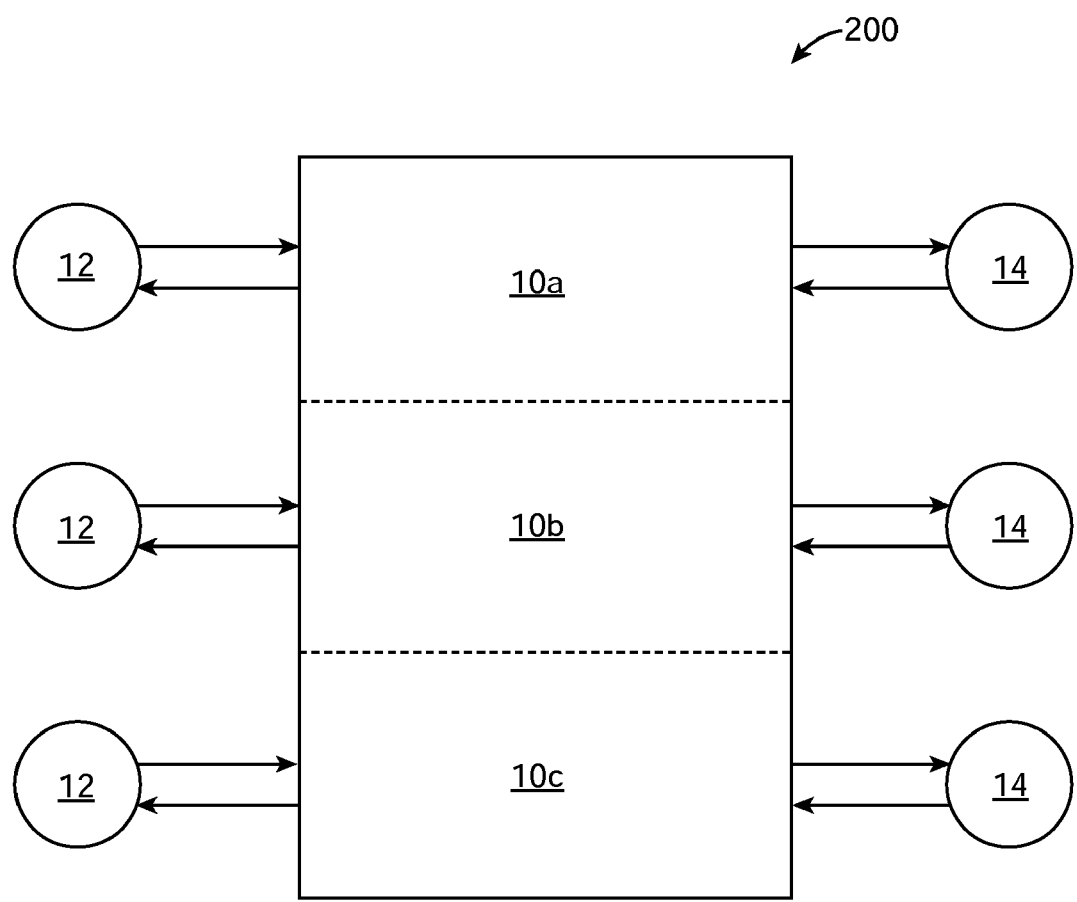
FIG. 7 illustrates another device for processing data being optically transmitted in accordance with other embodiments.

FIG. 7 illustrates another device 200 for processing data that are being transmitted optically in accordance with some embodiments. The device 200 is optically coupled between a first plurality of nodes 12 and a second plurality of nodes 14 in a 10GBASE-LRM network. The device 200 includes a plurality of sub-units 10, each of which may be any of the embodiments of the device 10 described herein. Although three units 10a-10c are shown, in other embodiments, the device 200 may include less than three units 10 or more than three units 10. In the illustrated embodiments, each unit 10 in the device 200 includes two optical splitters that are configured to operate at or around 1310 nm wavelength, such as those described with reference to FIG. 2. Alternatively, instead of having two optical splitters, any or all of the units 10 in the device 200 may each have one optical splitter that is configured to operate at or around 1310 nm wavelength, such as that described with reference to FIG. 4. In further embodiments, each unit 10 in the device 200 may include more than two optical splitters for coupling to more than one node 12 and/or more than one node 14.

Figure 8:
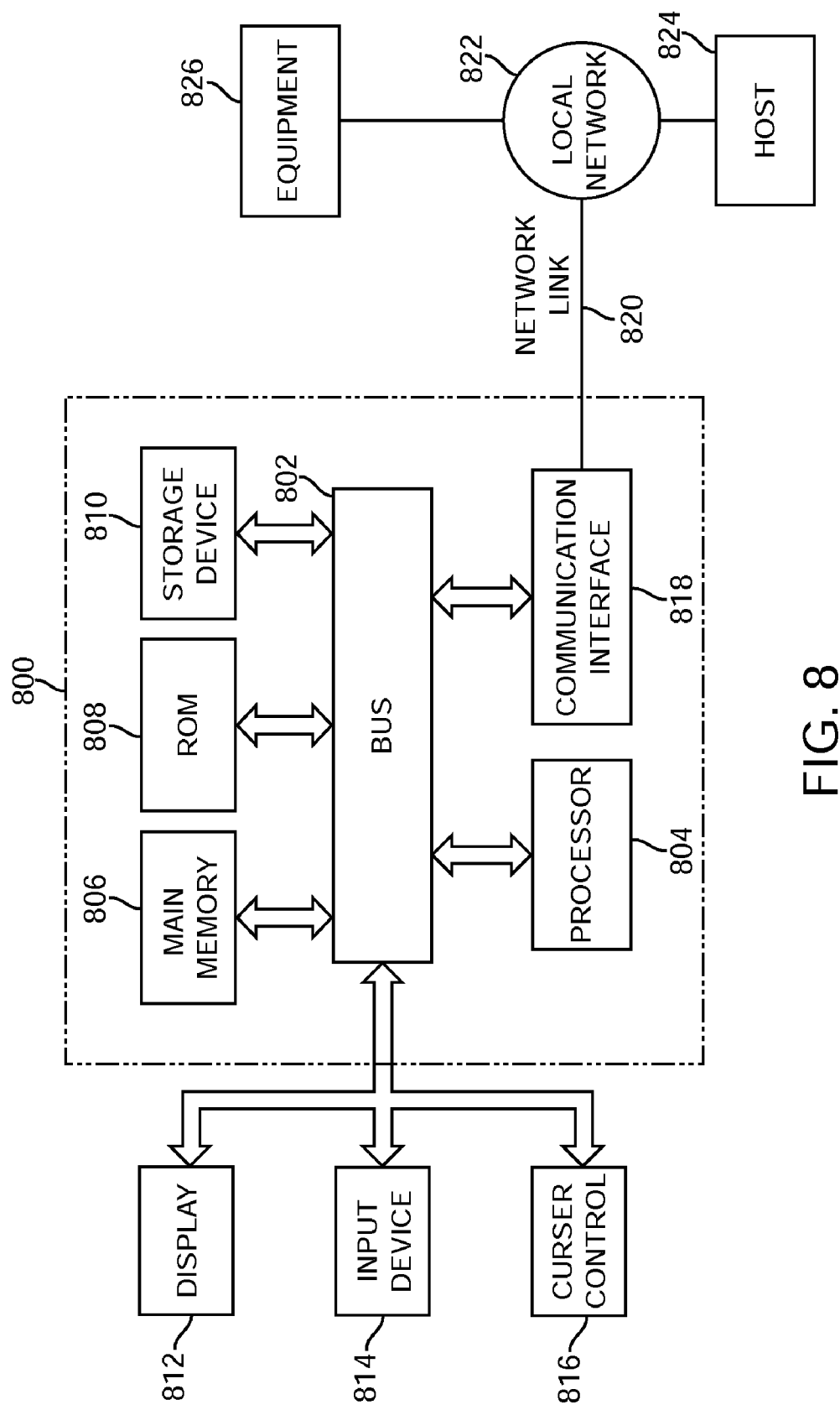
FIG. 8 is a block diagram of a computer system architecture, with which embodiments described herein may be implemented.

In any of the embodiments described herein, the output signal provided by any of the devices 10 may be transmitted to a computer system for processing. FIG. 8 is a block diagram that illustrates an embodiment of a computer system 800 upon which an embodiment of the invention may be implemented. Computer system 800 includes a bus 802 or other communication mechanism for communicating information, and a processor 804 coupled with the bus 802 for processing information. The processor 804 may be an example of the processor 110, or another processor that is used to perform various functions described herein. In some cases, the computer system 800 may be used to implement the processor 110. The computer system 800 also includes a main memory 806, such as a random access memory (RAM) or other dynamic storage device, coupled to the bus 802 for storing information and instructions to be executed by the processor 804. The main memory 806 also may be used for storing temporary variables or other intermediate information during execution of instructions to be executed by the processor 804. The computer system 800 further includes a read only memory (ROM) 808 or other static storage device coupled to the bus 802 for storing static information and instructions for the processor 804. A data storage device 810, such as a magnetic disk or optical disk, is provided and coupled to the bus 802 for storing information and instructions.

The computer system 800 may be coupled via the bus 802 to a display 812, such as a cathode ray tube (CRT) or a flat panel, for displaying information to a user. An input device 814, including alphanumeric and other keys, is coupled to the bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The computer system 800 may be used for performing various functions in accordance with the embodiments described herein. According to one embodiment, such use is provided by computer system 800 in response to processor 804 executing one or more sequences of one or more instructions contained in the main memory 806. Such instructions may be read into the main memory 806 from another computer-readable medium, such as storage device 810. Execution of the sequences of instructions contained in the main memory 806 causes the processor 804 to perform the process steps described herein. One or more processors in a multi-processing arrangement may also be employed to execute the sequences of instructions contained in the main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 804 for execution. Such a medium may take many forms, including but not limited to, non-volatile media, volatile media, and transmission media. Non-volatile media includes, for example, optical or magnetic disks, such as the storage device 810. Volatile media includes dynamic memory, such as the main memory 806. Transmission media includes coaxial cables, copper wire and fiber optics, including the wires that comprise the bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 804 for execution. For example, the instructions may initially be carried on a magnetic disk of a remote computer. The remote computer can load the instructions into its dynamic memory and send the instructions over a telephone line using a modem. A modem local to the computer system 800 can receive the data on the telephone line and use an infrared transmitter to convert the data to an infrared signal. An infrared detector coupled to the bus 802 can receive the data carried in the infrared signal and place the data on the bus 802. The bus 802 carries the data to the main memory 806, from which the processor 804 retrieves and executes the instructions. The instructions received by the main memory 806 may optionally be stored on the storage device 810 either before or after execution by the processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card or a modem to provide a data communication connection to a corresponding type of telephone line. As another example, the communication interface 818 may be a local area network (LAN) card to provide a data communication connection to a compatible LAN. Wireless links may also be implemented. In any such implementation, the communication interface 818 sends and receives electrical, electromagnetic or optical signals that carry data streams representing various types of information.

The network link 820 typically provides data communication through one or more networks to other devices. For example, the network link 820 may provide a connection through local network 822 to a host computer 824 or to equipment 826. The data streams transported over the network link 820 can comprise electrical, electromagnetic or optical signals. The signals through the various networks and the signals on the network link 820 and through the communication interface 818, which carry data to and from the computer system 800, are exemplary forms of carrier waves transporting the information. The computer system 800 can send messages and receive data, including program code, through the network(s), the network link 820, and the communication interface 818.

Although particular embodiments have been shown and described, it will be understood that they are not intended to limit the present inventions, and it will be obvious to those skilled in the art that various changes and modifications may be made without departing from the spirit and scope of the present inventions. For example, in other embodiments, any of the optical splitters described herein may be a part of a X-coupler, which combines and divides optical power from the two input fibers between the two output fibers. In further embodiments, any of the optical splitters described herein may be a part of a star coupler, which distributes optical power from more than two input fibers among several output fibers. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A device for processing data being optically transmitted via a LRM connection, comprising:
    an optical splitter for splitting an input signal into a first output signal and a second output signal, the optical splitter having an operating wavelength with a value that is between 1260 nm and 1355 nm, wherein the optical splitter has an input end for receiving the input signal, a first output end for outputting the first output signal, and a second output end for outputting the second output signal, and wherein the optical splitter is configured to be relatively more sensitive to a light signal at the operating wavelength with the value that is between 1260 nm and 1355 nm than a light signal at another wavelength;
    a first output port;
    a second output port; and
    an additional optical splitter;
    wherein the first output end of the optical splitter is coupled to the first output port for transmitting the first output signal out of the device; and
    wherein the additional optical splitter is configured to receive an additional input signal, and split the additional input signal into a third output signal and a fourth output signal, the additional optical splitter being coupled to the second output port for transmitting the third signal out of the device.

2. The device of claim 1, wherein the LRM connection comprises a 10GBASE-LRM connection.

3. The device of claim 1, further comprising an optical receiver optically coupled to the second output end of the optical splitter.

4. The device of claim 3, wherein the optical receiver has an operating wavelength with a value that is between 1260 nm and 1355 nm.

5. The device of claim 3, wherein the optical receiver and the optical splitter are mounted to a board.

6. The device of claim 3, wherein the second output end of the optical splitter is coupled to an optical port at a side of a housing, and the optical receiver is optically coupled to the second output end via the optical port.

7. The device of claim 3, further comprising a processor coupled to the optical receiver.

8. The device of claim 7, wherein the processor is configured to perform a process selected from the group consisting of data duplication, intrusion detection, network analysis, and network monitoring.

9. The device of claim 7, wherein the processor and the optical splitter are mounted to a board.

10. The device of claim 7, wherein the optical receiver is coupled to a port at a side of a housing, and the processor is coupled to the optical receiver via the port.

11. The device of claim 1, wherein the optical splitter is configured to provide a predetermined split ratio.

12. The device of claim 11, wherein the predetermined split ratio is 10/90, 20/80, 30/70, 40/60, or 50/50.

13. The device of claim 1, further comprising:
a housing for accommodating the optical splitter; and
an input port coupled to the input end of the optical splitter.

14. The device of claim 7, wherein the processor is configured to perform data duplication, intrusion detection, sessions capturing across parallel links and switches, data filtering, data flow configuration, or load division across multiple tools.

15. A method for processing data being optically transmitted, comprising:
optically receiving an input signal that is being transmitted via a LRM connection;
splitting the input signal into a first output signal and a second output signal using an optical splitter, the optical splitter having an operating wavelength with a value that is between 1260 nm and 1355 nm, wherein the optical splitter is configured to be relatively more sensitive to a light signal at the operating wavelength with the value that is between 1260 nm and 1355 nm than a light signal at another wavelength;
outputting the first output signal, wherein the first output signal is output to a first output port of a device;
outputting the second output signal;
optically receiving an additional input signal;
splitting the additional input signal into a third output signal and a fourth output signal using an additional optical splitter; and
outputting the third output signal from the additional optical splitter to a second output port of the device.

16. The method of claim 15, wherein the LRM connection comprises a 10GBASE-LRM connection.

17. The method of claim 15, wherein the first output signal is output so that it is passed downstream towards an intended recipient.

18. The method of claim 15, further comprising processing the second output signal.

19. The method of claim 18, wherein the second output signal is processed to perform a function selected from the group consisting of data duplication, intrusion detection, network analysis, and network monitoring.

20. The method of claim 15, wherein the input signal is split based on a predetermined split ratio.

21. The method of claim 20, wherein the predetermined split ratio is 10/90, 20/80, 30/70, 40/60, or 50/50.

22. The method of claim 15, wherein the second output signal is processed to perform data duplication, intrusion detection, sessions capturing across parallel links and switches, data filtering, data flow configuration, or load division across multiple tools.

* * * * *